United States Patent [19]

Phillips

[11] Patent Number: 4,488,714
[45] Date of Patent: Dec. 18, 1984

[54] MACHINE TOOL TABLE ADJUSTMENT MECHANISM

[76] Inventor: Fred Phillips, 25955 W. Sunset Rd., Barrington, Ill. 60010

[21] Appl. No.: 478,040

[22] Filed: Mar. 23, 1983

[51] Int. Cl.³ .............................................. B23Q 1/02
[52] U.S. Cl. .................................... 269/303; 269/233; 269/315
[58] Field of Search ................ 83/467 R, 467 A, 468, 83/435.1, 438, 446, 471.3; 269/139, 315–320, 303–304, 233, 235, 236, 905, 910

[56] References Cited

U.S. PATENT DOCUMENTS

| | | | |
|---|---|---|---|
| 151,001 | 5/1874 | Bevins et al. | 269/319 |
| 300,968 | 6/1884 | Hatfield | 254/15 |
| 357,644 | 2/1887 | Tucker | 145/1 B |
| 722,677 | 3/1903 | Crippen et al. | 269/233 |
| 1,018,070 | 2/1912 | Morehead | 254/15 |
| 1,199,454 | 9/1916 | De Vries | 254/15 |
| 1,414,878 | 5/1922 | Howe | 254/15 |
| 1,805,395 | 5/1931 | Glass | 269/319 |
| 2,132,553 | 10/1938 | Andrejchak | 254/15 |
| 2,718,375 | 9/1955 | Purdy | 254/15 |
| 3,945,281 | 3/1976 | Kreitz | 83/471.3 |
| 4,061,323 | 12/1977 | Beekenkamp | 269/139 |
| 4,290,582 | 9/1981 | Eckelkamp | 254/15 |

FOREIGN PATENT DOCUMENTS 113429 7/1941 Australia ........................... 83/471.3

Primary Examiner—Robert C. Watson
Attorney, Agent, or Firm—Willian, Brinks, Olds, Hofer, Gilson & Lione Ltd.

[57] ABSTRACT

A machine tool table is disclosed having a lock accessible at the front of the table for applying pressure through a connection to a rear board so that a fence and at least one table spacer are held in position between the rear board and the front table. The lock may be adjusted at the front table to release the pressure so that the position of the fence may be changed.

24 Claims, 2 Drawing Figures

MACHINE TOOL TABLE ADJUSTMENT MECHANISM

BACKGROUND OF THE INVENTION

The present invention relates to an adjustment mechanism for holding a fence on a machine tool table in its selected position. The fence on a machine tool table provides an abutment against which a work piece is held to properly position the work piece for machining. The present invention is particularly adapted for use on a radial arm saw table.

A radial arm saw table is generally provided with a front table securely mounted to support rails. Table spacers are mounted on the support rails so that they may slide along the rails towards or away from the front table. A fence also slides along the rails and its position can be interchanged with the table spacers. Typically, the fence and table spacers are held in position by clamps at the rear of the table which hold the table spacers and the fence securely against the front table. For a person working at the saw table to change the position of the fence, he would have to walk around the table to the rear to unclamp each of the clamps. Then, the fence can be pulled out and repositioned relative to the table spacers and the clamps can be retightened. If the operator is performing many operations on the saw table, it can be a nuisance for him to have to walk around to the back of the table each time he wants to change the position of the fence. Attempting to change the position of the fence from the front of the table by leaning over the table can be dangerous because of the saw blade and would tend to dirty the operator's clothes because of the saw dust accumulated on the table. Another problem which is encountered with having a plurality of clamps at the rear of the table is that they may cause the fence to be improperly aligned if the clamps are unevenly tightened. It is an object of the present invention to provide a saw table which overcomes these stated disadvantages.

SUMMARY OF THE INVENTION

The present invention is directed to a machine tool table of the type with a front table securely mounted to support rails extending from the underside of the table. A rear board is mounted on the rails so that it may slide towards or away from the front table. A fence and at least one table spacer are mounted in position between the front table and the rear board. Means are provided for connecting the rear board to the front table. There is a lock which is accessible at the front table for applying and releasing pressure between the rear board and the front table through the connecting means. When pressure is applied, the table spacers and fence are held securely in position on the table. When the pressure is released, the fence and table spacers may be removed and interchanged so that the position of the fence on the table can be changed. Accordingly, the operator can change the position of the fence on the table without any need for moving from his position at the front of the table. Neither does the operator have to lean all the way to the rear of the table to make a change in the fence position. Advantageously, the change in fence position can be made with the opening and closing of a single lock located at the front of the table.

Other objects and advantages of the present invention will become apparent during the following description of the presently preferred embodiment of the invention taken in conjunction with the drawings.

DETAILED DESCRIPTION OF THE PREFERRED EMBODIMENT

Figure 1:
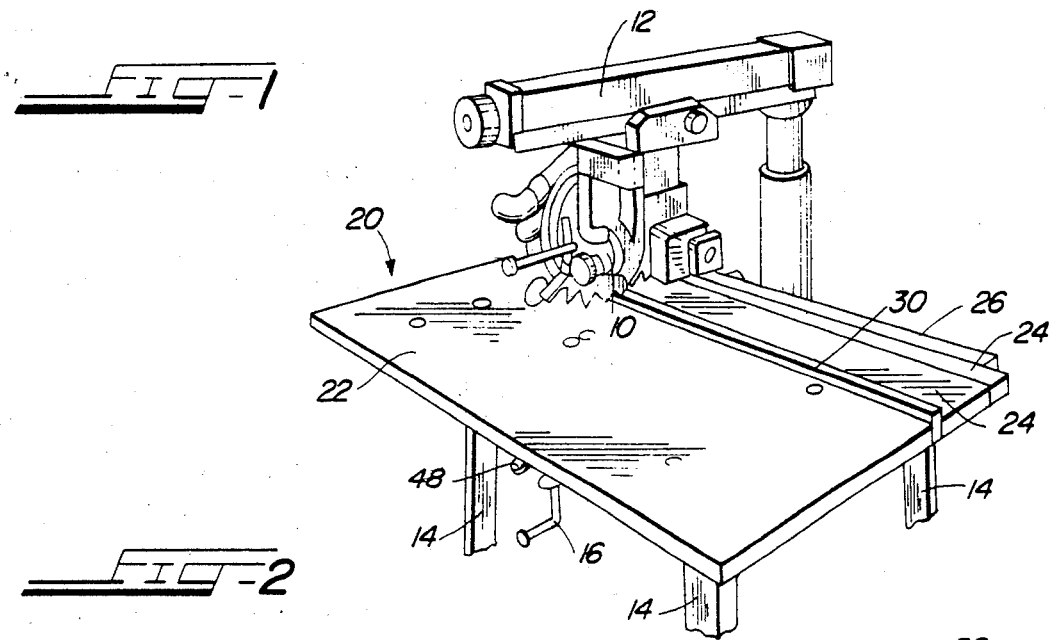
FIG. 1 is a perspective view of a radial arm saw table of the present invention.

Referring now to the drawings, FIG. 1 shows a radial arm saw positioned above its table. A saw 10 is mounted on a radial arm 12 for selected movement and positioning. The operation of the radial arm saw is familiar to those skilled in the art.

A work piece of lumber is placed on the machine tool table 20. Accurate positioning of the work piece is obtained by placing it against a fence 30. The table 20 is supported by legs 14. The elevation of the saw can be adjusted by a crank 16 accessible at the front of the table 20. The table top is comprised of several portions. There is a large front table 22, two table spacers 24 and a rear board 26. The fence 30 is also part of the table top and may be interchanged in position with the table spacers 24. To obtain greater variety in the positioning of the fence 30, the table spacers 24 may be of varying widths. It would also be possible to have more than one or two table spacers 24, thereby increasing the number of possible fence positions. The front table 22, the table spacers 24 and the fence 30 are generally made of inexpensive wood, preferably particle board. Since, it is not uncommon for the saw blade to make cuts through these table portions when it is completing a cut through a work piece, the table portions tend to wear out and require replacement. Therefore, it is advantageous that in the present invention the fence, the front table and table spacers are made of inexpensive materials which do not need to be specially machined. The only machining required is that these table portions be squared. To provide added strength for holding the table spacers and fence in position against the front table, the rear board 26 is preferably made of a hardwood, such as cherry or oak.

Figure 2:
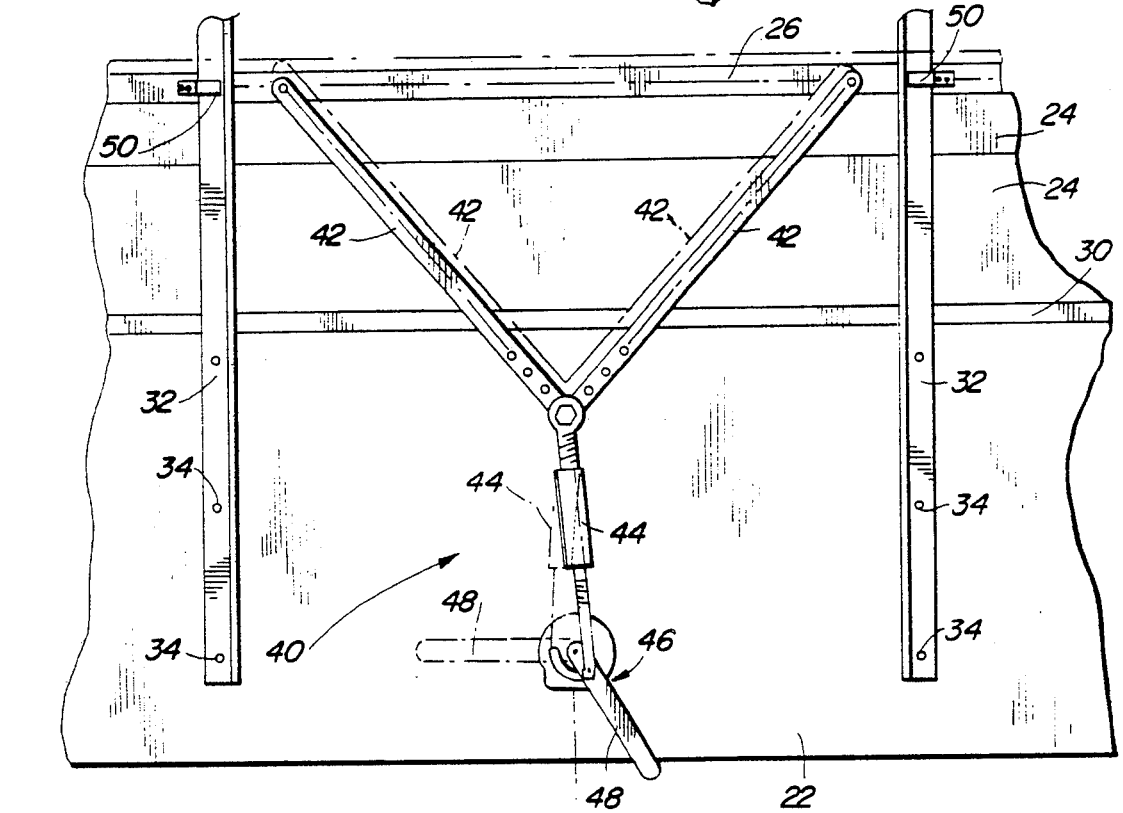
FIG. 2 is a plan view of the underside of a machine tool table of the present invention.

An embodiment of a device of the present invention for holding the pieces of the table top securely together is shown in FIG. 2. A single locking device 40 operates to apply pressure between the rear board 26 and the front table 22, thereby holding the table pieces in between in position. All pieces of the table are supported upon the support rails 32. The table support rails 32 are securely mounted to the front table 22 by wood screws 34 or some other equivalent fastening means known to those skilled in the art. The remaining table pieces mounted on the support rails 32 can slide horizontally back and forth towards or away from the front table 22 when the locking device 40 is released.

The locking device 40 connects the rear board 26 to the front table 22. Two galvanized straps 42 are secured to the rear board 26 at two points equidistant from the center of the rear board 26. The straps are made of ¾' galvanized strapping. The ends of the straps 42 are bolted to the rear board 26. 10-32 bolts 1¼" in length may be used. At their other end, the straps 42 are connected to each other and to a turnbuckle 44. Thus, the straps 42 form a V-shape where the top of the "V" connects to the rear board 26 and the bottom of the "V" connects to the turnbuckle 44. The turnbuckle 44 con nects the V-shaped straps to an overcenter lock 46. The overcenter lock 46 is securely mounted to the front table 22. The overcenter lock 46 is shown with its lock arm 48 in the locked position in FIG. 2. The dotted lines show the lock arm in the released position. The turnbuckle 44 is fastened to the lock arm by a rivet or the like. When the lock arm 48 is moved from the released position to the locked position, it pulls against the turnbuckle 44 thereby pulling on the rear board 26 through the V-shaped straps 42 to hold the pieces of the table securely in position. By connecting the V-shaped straps 42 at locations an equal distance from the center of the rear board 26 an even force is applied to the rear board 26 to pull it squarely in line with the front table 22.

Since the force of the locking device 40 is only being applied through the underside of the rear board 26, it would be possible for the pulling to cause a buckling of the table portions. It is necessary to insure that the force being applied by the locking device 40 is only horizontal in direction so that the table portions do not buckle up out of the table top. For this purpose, steel strips 50 are mounted to the rear board 26 to fit over the support rails 32. Wood screws are used to secure the steel strips 50 to the rear board 26. The steel strips 50 have a step in them. The strips 50 are secured flat against the rear board 26 while the steps provides the elevation to fit the strips 50 over the support rails 32. The steel strips 50 keep the rear board 26 sliding in the track formed along the support rails 32 and thus prevent the rear board 26 from moving vertically away from the rails 32. The strips 50 prevent the rear board 26 from imparting any vertical forces to the neighboring portions of the table. When the locking device 40 is adjusted into the locked position, the rear board 26 is pulled horizontally towards the front table 22 parallel to the support rails 32 to hold the pieces of the table firmly in position.

The present invention provides the operator with an advantageously simple means for adjusting the position of the fence while he is working at the machine tool table. The operator merely reaches underneath the front table 22 to unlock the single overcenter lock 46 by turning the lock arm 48. This loosens the pressure on the table pieces so that the operator can easily remove the fence 30 and interchange its position with the table spacers 24. The lock arm 48 is returned to its locked position and the operator is ready to continue working with his saw. The change in fence position was achieved without the need for reaching all the way to the rear of the table 20, nor was it necessary for the operator to leave his position at the front table. The present invention only requires the adjustment of a single lock, therefore excess time is not wasted adjusting several locks or clamps.

Of course, it should be understood that various changes and modifications to the preferred embodiment described above will be apparent to those skilled in the art. For example, a crank and screw mechanism could replace the overcenter lock to apply the pressure to the rear board. It would also be possible to change the materials and shape of the V-shaped straps. These and other changes can be made without departing from the spirit and the scope of the invention and without diminishing its attendant advantages. It is therefore intended that such changes and modifications be covered by the following claims.

I claim:

1. A locking device, for use on a machine tool table having a front table securely mounted on a plurality of table support rails and having a plurality of table portions interchangeably positioned on the support rails, comprising:
   a rear board to place upon said support rails at the rear of said machine tool table;
   a single pressure applying and releasing device mountable on the underside of said front table; and
   means located on the underside of the machine tool table for connecting said pressure applying and releasing device to at least two points along said rear board so that when pressure is applied to said connecting means said rear board is pulled towards said front table to hold the portions of said machine tool table on said support rails securely in position.

2. The locking device of claim 1 wherein said single pressure applying and releasing device comprises an overcenter lock.

3. The locking device of claim 2 further comprising means for holding said rear board on said support rails and for guiding said rear board along said support rails.

4. The locking device of claim 3 wherein said connecting means comprises V-shaped strap means connected at the top of the V to said rear board and coupled at the bottom of the V to said overcenter lock.

5. The locking device of claim 4 wherein said connecting means further comprises a turnbuckle connected between said V-shaped strap means and said overcenter lock.

6. A machine tool table comprising:
   a front table;
   a plurality of table support rails secured to the underside of said front table;
   a rear board positioned on said support rails so that said rear board may slide in either direction along said rails towards or away from said front table;
   a fence positioned on said support rails between said front table and said rear board;
   at least one table spacer positioned on said support rails between said front table and said rear board, said at least one table spacer being interchangeable in position with said fence;
   connection means on the underside of the tool table attached to said rear board in at least two places; and
   a single locking means mounted to said front table and attached to said connection means for applying and releasing pressure between said front table and said rear board through said connection means so that said fence and said at least one table spacer may be held in position when pressure is applied and may be removed and interchanged when pressure is released.

7. The machine tool table of claim 6 wherein said locking means is located on the underside of the front table.

8. The machine tool table of claim 6 wherein said connection means comprises V-shaped strap means connected at the top of the V to said rear board and coupled at the bottom of the V to said locking means.

9. The machine tool table of claim 8 wherein said V-shaped strap means is coupled to said locking means by a turnbuckle.

10. The machine tool table of claim 6 further comprising means for holding said rear board on said support rails so that said rear board may not move vertically away from said rails.

11. In a radial arm saw table having a front table secured to a plurality of table support rails and including a fence and at least one table spacer interchangeably mounted on said support rails, the improvement comprising:

a rear board mounted on said support rails at the rear of the saw table;

connecting means on the underside of the saw table attached to said rear board at two points equidistant from the center of the rear board;

locking means interactive with said connecting means, said locking means including an arm accessible at said front table capable of assuming a locked or unlocked position such that in the locked position said rear board is pulled towards said front table to securely hold said fence and said at least one table spacer in position against said front table and such that in the unlocked position said fence and said at least one table spacer may be freely interchanged in position.

12. The saw table of claim 11 wherein said locking means comprises an overcenter lock mounted on said front table.

13. The saw table of claim 11 wherein said connecting means comprises V-shaped strap means secured to said rear board and coupled to said locking means.

14. The saw table of claim 13 wherein said connecting means further comprises a turnbuckle connected between said V-shaped strap means and the arm of said locking means.

15. The saw table of claim 11 further comprising means for holding said rear board on said support rails so that said rear board may not move vertically away from said rails.

16. A radial arm saw table comprising:

a front table;

a plurality of table support rails secured to the underside of said front table;

a rear board mounted on said support rails so that said rear board may slide in either direction along said rails towards or away from said front table;

means for holding said rear board on said support rails so that said rear board may move only horizontally and parallel to said support rails;

a fence mountable on said support rails between said front table and said rear board;

at least one table spacer mountable on said support rails between said front table and said rear board, said at least one table spacer being interchangeable in position with said fence;

V-shaped strap means attached to said rear board at the top of the V so that each of the two segments of the V-shaped strap means is attached to said rear board at points equidistant from the center of said rear board; and an overcenter lock mounted to the underside of said front table and coupled to said V-shaped strap means so that locking said lock pulls upon said rear board through said V-shaped strap means to hold said fence and said at least one table spacer securely in position and so that unlocking said lock allows said fence and said at least one table spacer to be interchanged in position.

17. The locking device of claim 1, wherein the connecting means is attached to the rear board at points equidistant from the center of the rear board.

18. The locking device of claim 17, wherein the connecting means is attached to the rear board at two points.

19. The machine tool table of claim 6, wherein the connecting means is attached to the rear board at places equidistant from the center of the rear board.

20. The machine tool table of claim 6, wherein the connecting means is attached to the rear board at two places equidistant from the center of the rear board.

21. The machine tool table of claim 20, wherein the locking means comprises an overcenter lock.

22. The machine tool table of claim 8, wherein the locking means comprises an overcenter lock.

23. The machine tool table of claim 7, wherein said connection means comprises V-shaped strap means connected at the top of the V to said rear board and coupled at the bottom of the V to said locking means.

24. The machine tool table of claim 23, wherein the locking means comprises an overcenter lock.

* * * * *